US011062677B2

(12) United States Patent
Mafoodh et al.

(10) Patent No.: US 11,062,677 B2
(45) Date of Patent: *Jul. 13, 2021

(54) AUTOMATIC APPLICATION OF MAPPING FUNCTIONS TO VIDEO SIGNALS BASED ON INFERRED PARAMETERS

(71) Applicant: Microsoft Technology Licensing, LLC, Redmond, WA (US)

(72) Inventors: Abo Talib Mafoodh, Kirkland, WA (US); Mehmet Kucukgoz, Seattle, WA (US); Holly H. Pollock, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,457

(22) Filed: May 12, 2020

(65) Prior Publication Data

US 2020/0273430 A1  Aug. 27, 2020

Related U.S. Application Data

(63) Continuation of application No. 15/971,782, filed on May 4, 2018, now Pat. No. 10,692,467.

(51) Int. Cl.
  *G09G 5/10* (2006.01)
  *G06N 3/08* (2006.01)
  *G06N 3/04* (2006.01)

(52) U.S. Cl.
  CPC .............. *G09G 5/10* (2013.01); *G06N 3/08* (2013.01); *G06N 3/0445* (2013.01); *G09G 2320/0626* (2013.01); *G09G 2320/08* (2013.01); *G09G 2354/00* (2013.01); *G09G 2360/144* (2013.01)

(58) Field of Classification Search
  None
  See application file for complete search history.

(56) References Cited

U.S. PATENT DOCUMENTS

| | | | |
|---|---|---|---|
| 2006/0088275 A1* | 4/2006 | O'Dea | H04N 21/42202 386/304 |
| 2016/0307032 A1* | 10/2016 | Butler | G06K 9/00375 |
| 2018/0192265 A1* | 7/2018 | Zawada | G06N 3/08 |
| 2018/0357078 A1* | 12/2018 | Ando | G06N 20/00 |
| 2019/0295287 A1* | 9/2019 | De Villers-Sidani | G06K 9/4628 |

\* cited by examiner

*Primary Examiner* — Yi Wang
(74) *Attorney, Agent, or Firm* — Holzer Patel Drennan

(57) ABSTRACT

Devices and methods for automatic application of mapping functions to video signals based on inferred parameters are provided. In one example, a method, including initiating display of content based on a video signal being processed by a device, is provided. The method may further include in response to at least a first change in an intensity of ambient light or a second change in a color of the ambient light subsequent to the initiating of the display of the content based on the video signal, selecting a first mapping function applicable to pixels corresponding to frames of the video signal based at least on a first inferred parameter from a selected machine learning model. The method may further include automatically applying the first mapping function to a first plurality of pixels corresponding to a first set of frames of the video signal.

20 Claims, 6 Drawing Sheets

AUTOMATIC APPLICATION OF MAPPING FUNCTIONS TO VIDEO SIGNALS BASED ON INFERRED PARAMETERS

This application is a continuation of U.S. application Ser. No. 15/971,782, entitled "Automatic Application of Mapping Functions to Video Signals Based on Inferred Parameters" filed on May 14, 2018, the disclosure of which is incorporated herein in its entirety by reference.

BACKGROUND

Devices with displays may be used across a plethora of ambient lighting conditions. Users of such devices may view different types of content in these widely divergent ambient lighting conditions. Certain devices may include light sensors or light meters to measure the amount of ambient light in the user's environment. Based on the measurement of the amount of the ambient light, the device or the user may adjust the brightness of the content being displayed to the user. The adjustment may not satisfy the user because despite the adjustment of the brightness the content may not be clearly visible or may still be otherwise deficient.

Thus, there is a need for methods and systems for automatic application of mapping curves to adjust the display parameters.

SUMMARY

In one example, the present disclosure relates to a method including initiating display of content based on a video signal being processed by a device. The method may further include in response to at least a first change in an intensity of ambient light or a second change in a color of the ambient light subsequent to the initiating of the display of the content based on the video signal, selecting a first mapping function applicable to pixels corresponding to frames of the video signal based at least on a first inferred parameter from a selected machine learning model. The method may further include automatically applying the first mapping function to a first plurality of pixels corresponding to a first set of frames of the video signal.

In another example, the present disclosure relates to a device including a processor configured to initiate display of content based on a video signal being processed by the device. The device may further include a memory comprising at least one module including instructions configured: (1) to, in response to at least a first change in an intensity of ambient light or a second change in a color of the ambient light subsequent to an initiation of the display of the content based on the video signal, select a first mapping function applicable to pixels corresponding to frames of the video signal based at least on a first inferred parameter from a selected machine learning model, and (2) to automatically apply the first mapping function to a first plurality of pixels corresponding to a first set of frames of the video signal.

In yet another example, the present disclosure relates to a computer readable medium including a first set of instructions configured to initiate display of content based on a video signal to a user of a device. The computer readable medium may further include a second set of instructions configured to in response to at least a first change in an intensity of ambient light or a second change in a color of the ambient light subsequent to the initiating of the display of the content based on the video signal, select a first mapping function applicable to pixels corresponding to frames of the video signal based at least on a first inferred parameter from a selected machine learning model. The computer readable medium may further include a third set of instructions configured to automatically apply the first mapping function to a first plurality of pixels corresponding to a first set of frames of the video signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to automatically applying mapping functions to pixels corresponding to a signal, such as a video signal based on inferred parameters. In certain examples, the inferred parameters may be dynamically generated by using machine learning models and corresponding instructions. Devices with displays (e.g., smartphones, tablets, laptops, and other type of devices) may be used in a variety of ambient lighting conditions. As an example, a user may begin watching a video inside their home, but then may walk out of the home and continue watching the video while outside. When the user is trying to improve the visibility of the video playback, desktop-wide display settings may only get the user so far. As an example, in the bright outdoor environments, it may be almost impossible for the user to make out the details in a video even with the display brightness turned all the way up.

Certain devices may include light sensors or light meters to measure the amount of ambient light in the user's environment. Based on the measurement of the amount of the ambient light, the device or the user may adjust the brightness of the content being displayed to the user. The adjustment may not satisfy the user because despite the adjustment of the brightness the content may not be clearly visible or may still be otherwise deficient.

Figure 1:
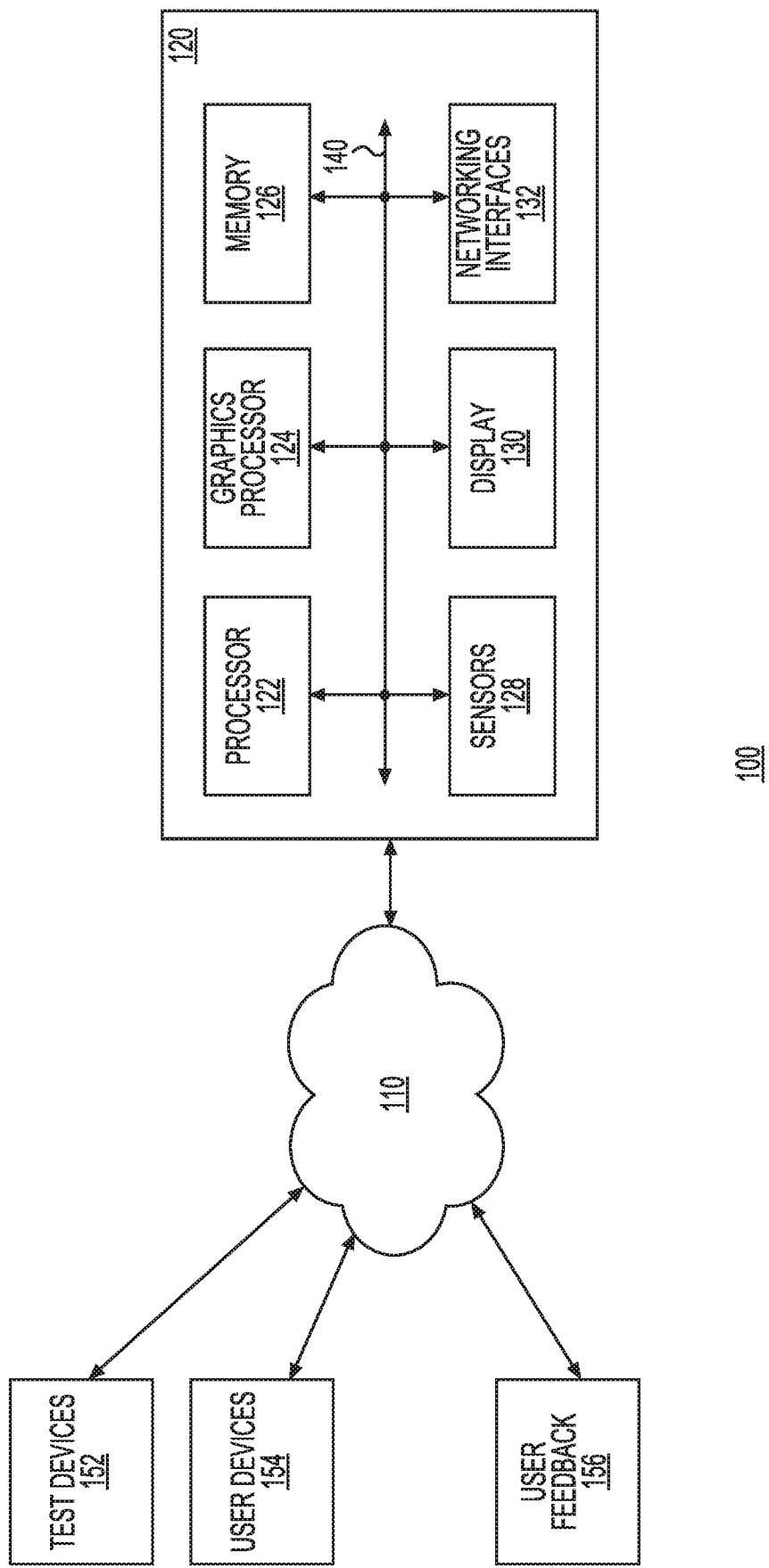
FIG. 1 shows a diagram of a system environment 100 for automatic application of mapping functions to video signals based on inferred parameters in accordance with one example.

FIG. 1 shows a diagram of a system environment 100 for automatic application of mapping functions to video signals based on inferred parameters in accordance with one example. User devices 154 may be coupled via network 110 to remote computing functionalities, including cloud computing infrastructure that may store user feedback 156. Test devices 152 may also be coupled via network 110 such that feedback obtained via test devices 152 may be added to user feedback 156. Details of one user device 120 are provided in FIG. 1. Other user devices may include similar functionality. User device 120 may include a processor 122, a graphics processor 124, a memory 126, sensors 128, display 130, and networking interfaces 132, which may be interconnected via a bus system 140. Network 110 may be a wired network, a wireless network, or a combination of both wired and wireless networks. Processor 122 and graphics processor 124 may execute instructions stored in memory 126. Memory 126 may be any combination of non-volatile storage or volatile storage (e.g., flash memory, DRAM, SRAM, or other types of memories). Sensors 128 may include touch sensors, light intensity sensors, color temperature sensors, pressure sensors, proximity sensors, GPS sensors, and other types of sensors. Display 130 may be any type of display, such as LCD, LED, or other types of display. Network interfaces 132 may include communication interfaces, such as Ethernet, cellular radio, Bluetooth radio, UWB radio, or other types of wireless or wired communication interfaces. Although FIG. 1 shows the system environment as including a certain number of components arranged and coupled in a certain way, the system environment may include fewer or additional components arranged and coupled differently. In addition, although FIG. 1 shows user device 120 as including certain number of components arranged and coupled in a certain way, user device 120 may include fewer or additional components arranged and coupled differently. As an example, user device 120 may include other components such as a keyboard, a mouse, a voice recognition processor, an artificial intelligence processor, or touch screens.

Figure 2:
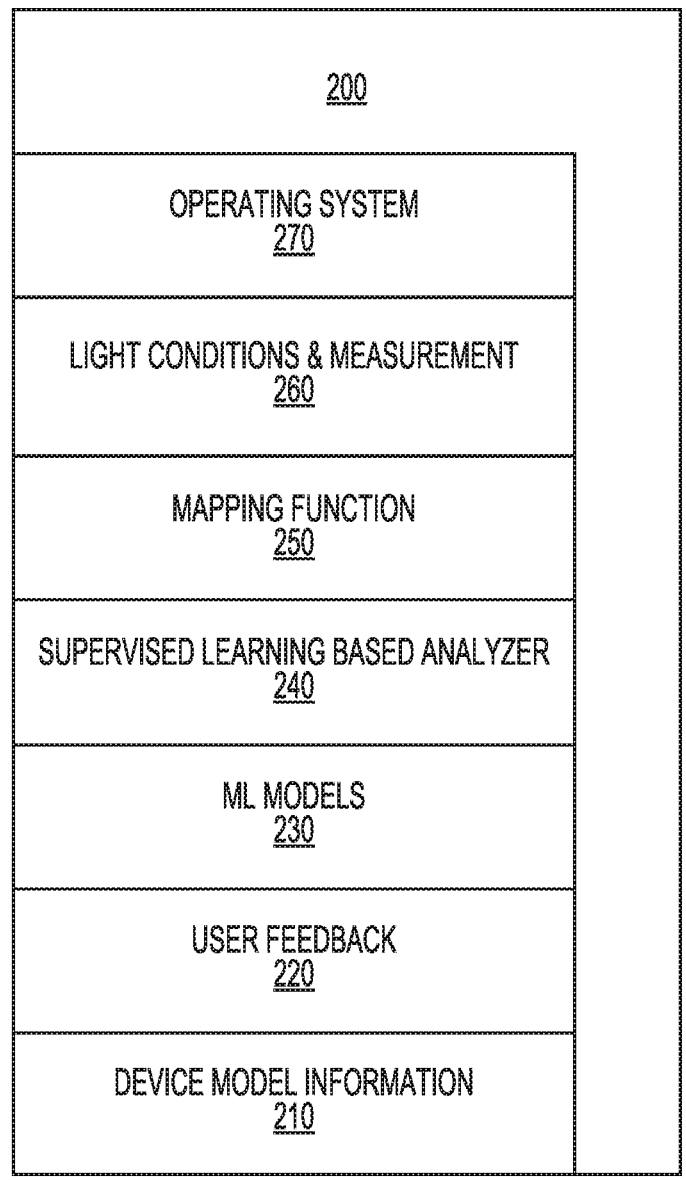
FIG. 2 shows a memory including instructions for automatic application of mapping functions to video signals based on inferred parameters in accordance with one example.

FIG. 2 shows a memory 200 including instructions for automatic application of mapping functions to video signals based on inferred parameters in accordance with one example. In this example, the instructions may be organized in memory 200 in the form of blocks or modules. Memory 200 may be memory 126 of user device 120. In this example, memory 200 may include device model information 210, user feedback 220, machine learning (ML) models 230, supervised learning-based analyzer (SLBA) 240, mapping functions 250, light conditions and measurement 260, and an operating system 270. Although FIG. 2 shows modules of instructions organized in a certain way, the instructions may be combined or distributed in various ways.

With continued reference to FIG. 2, supervised learning-based analyzer (SLBA) 240 may implement a supervised learning algorithm that can be trained based on input data and once it is trained it can make predictions or prescriptions based on the training. In this example, SLBA 240 may implement techniques such as Linear Regression, Support Vector Machine (SVM) set up for regression, Random Forest set up for regression, Gradient-boosting trees set up for regression and neural networks. Linear regression may include modeling the past relationship between independent variables and dependent output variables. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a supervised learning-based model may be translated into vector representations corresponding to any of these techniques. Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tanh(c_t)$$

In this example, inside each LSTM layer, the inputs and hidden states may be processed using a combination of vector operations (e.g., dot-product, inner product, or vector addition) or non-linear operations, if needed.

Although FIG. 2 describes supervised learning-based analyzer 240 as comprising instructions, the instructions could be encoded as hardware corresponding to an A/I processor. In this case, some or all of the functionality associated with the supervised learning-based analyzer 240 may be hard-coded or otherwise provided as part of an A/I processor. As an example, A/I processor may be implemented using an FPGA with the requisite functionality.

Figure 3:
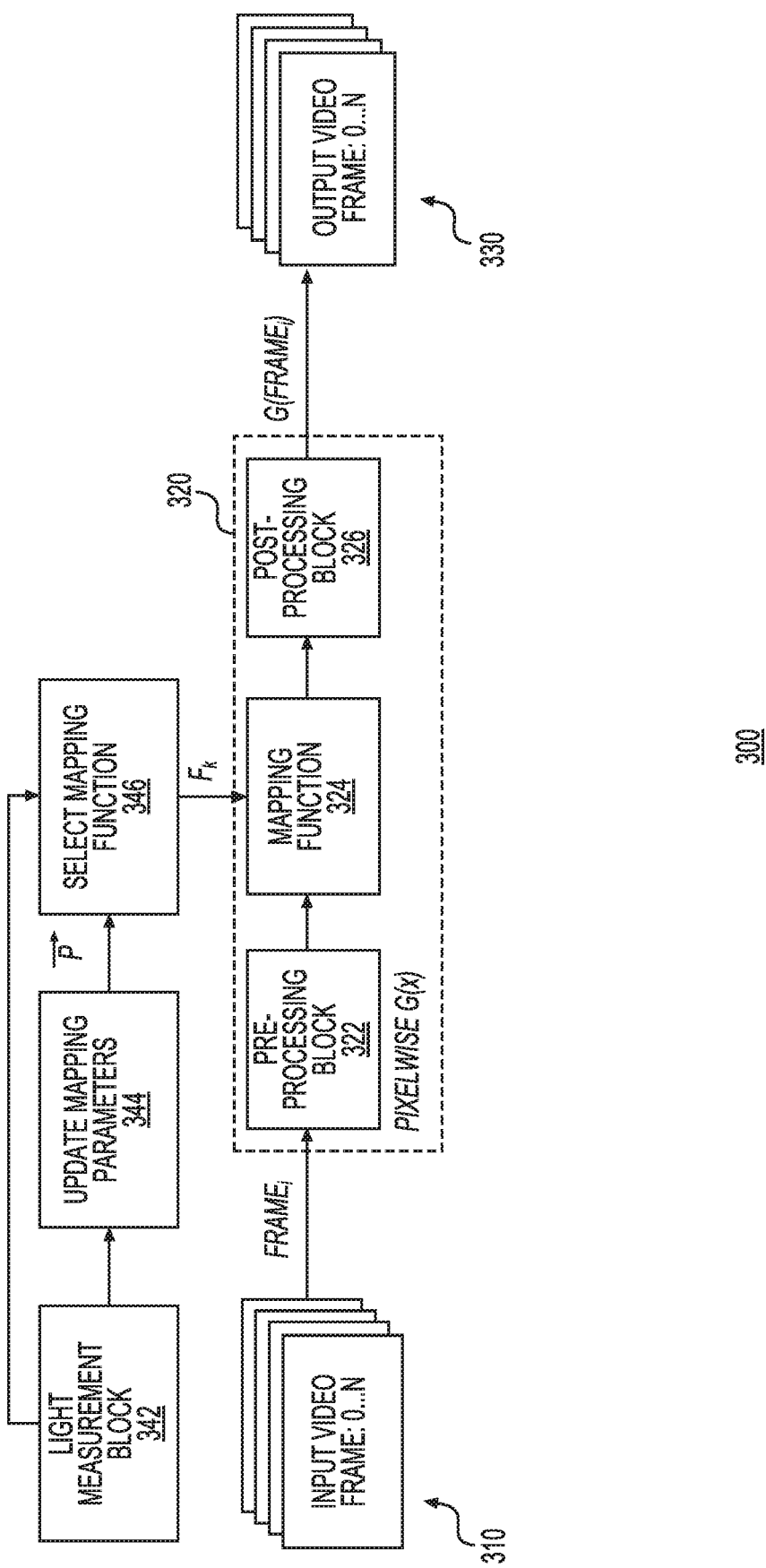
FIG. 3 is a block diagram showing the collection of data for use as training data for machine learning models in accordance with one example.

FIG. 3 is a block diagram 300 showing the collection of data for use as training data for machine learning models in accordance with one example. In one example, user devices and test devices may include instructions corresponding to modules that may enable the functionality described with respect to FIG. 3. As an example, device 120 may initiate the display of a video signal to a user of device 120. The video signal may include input video frames 310, which may be processed by a graphics processing pipeline 320, and then output as output video frames 330. The video signal may be encoded into frames or other types of units using any of the video encoding standards, including H.264, H.265, VP9, or other video encoding standards. Frames corresponding to the video signal may include pixels. The pixels corresponding to the input frames may first be processed by a pre-processing block 322. The pixels may then be modified by an application of at least one mapping function 324. Next, the pixels may be processed by a post-processing block 326 before being output as output video frames 330. The output video frames may be used to display content corresponding to the video signal. As part of creating the training data for machine learning models or as part of research or test devices, various mapping functions may be tested. As an example, a device similar to device 120 may include instructions corresponding to a light measurement block 342, which may be configured to receive ambient light intensity information from a light sensor (e.g., a light meter) and process the sensor generated information. In this example, the processing by light measurement block 342 may include categorizing the light sensor generated information into certain classes of ambient light. As an example, Table 1 below shows classification of lighting conditions into nine categories.

TABLE 1

| Lighting Condition | From (lux) | To (lux) |
|---|---|---|
| Pitch black | 0 | 10 |
| Very Dark | 11 | 50 |
| Dark Indoors | 51 | 200 |
| Dim Indoors | 201 | 400 |
| Normal Indoors | 401 | 1,000 |
| Bright Indoors | 1,1001 | 5,000 |
| Dim Outdoors | 5,001 | 10,000 |
| Cloudy Outdoors | 10,001 | 31,000 |
| Direct Sunlight | 3001 | 100,000 |

Although Table 1 shows nine categories of the ambient light conditions, light measurement block 342 may have instructions that may categorize the ambient light conditions into fewer or more categories. Update mapping parameters 344 may include instructions configured to update the mapping parameters based on the input from light measurement block 342. Select mapping function 346 may include instructions configured to select a mapping function based on the updated mapping parameters. Although FIG. 3 shows certain blocks arranged in a certain manner to generate training data for the machine learning models, these blocks could be arranged differently. Table 2 below shows high-level instructions for performing the functions associated with the various blocks described with respect to FIG. 3.

TABLE 2

| | |
|---|---|
| 1: | Initialize video playback |
| 2: | Initialize Light measurement block |
| 3: | Get environment's light |
| 4: | Set mapping parameter vector $\vec{P}$ based on light values |
| 5: | Set mapping function $F_k$ based on $\vec{P}$ |
| 6: | For each Frame$_i$ in input video |
| 7: |    If environment's light conditions changed then |
| 8: |       Update mapping parameter vector $\vec{P}$ |
| 9: |       Select new mapping function $F_k$ |
| 10: |    Else |
| 11: |       Use mapping function $F_k$ |
| 12: |    End If |
| 13: |    For each pixel $p_j$ in Frame$_i$ |
| 14: |       Pre-Process RGB values |
| 15: |       Apply mapping function $F_k$ |
| 16: |       Post-Process the output |
| 17: |    End For |
| 18: | End for |

With continued reference to FIG. 3, by testing or conducting other types of research using a device similar to device 120, various mapping parameters and corresponding mapping functions may be obtained. The data corresponding to these may then be used to train a neural network model or a similar machine learning model to minimize an error function. In one example, the minimization of the error function may be obtained by obtaining user feedback on the various mapping parameters and corresponding mapping functions to determine appropriate weights for convolution operations or other types of operations to be performed as part of machine-based learning. As an example, the users in a test environment may be provided with a set of preselected mapping functions with known parameters and asked to select the mapping function or the mapping curve that they prefer. In one example, the users may not have any control over the mapping parameters; instead instructions associated with device 120 may determine the appropriate mapping curve based on the user's feedback. Alternatively, the users may be allowed to select specific mapping parameters. The trained machine learning model may be stored in a remote computing facility, such as the cloud. Different machine learning models corresponding to different types of devices may be trained by the respective users.

Figure 4:
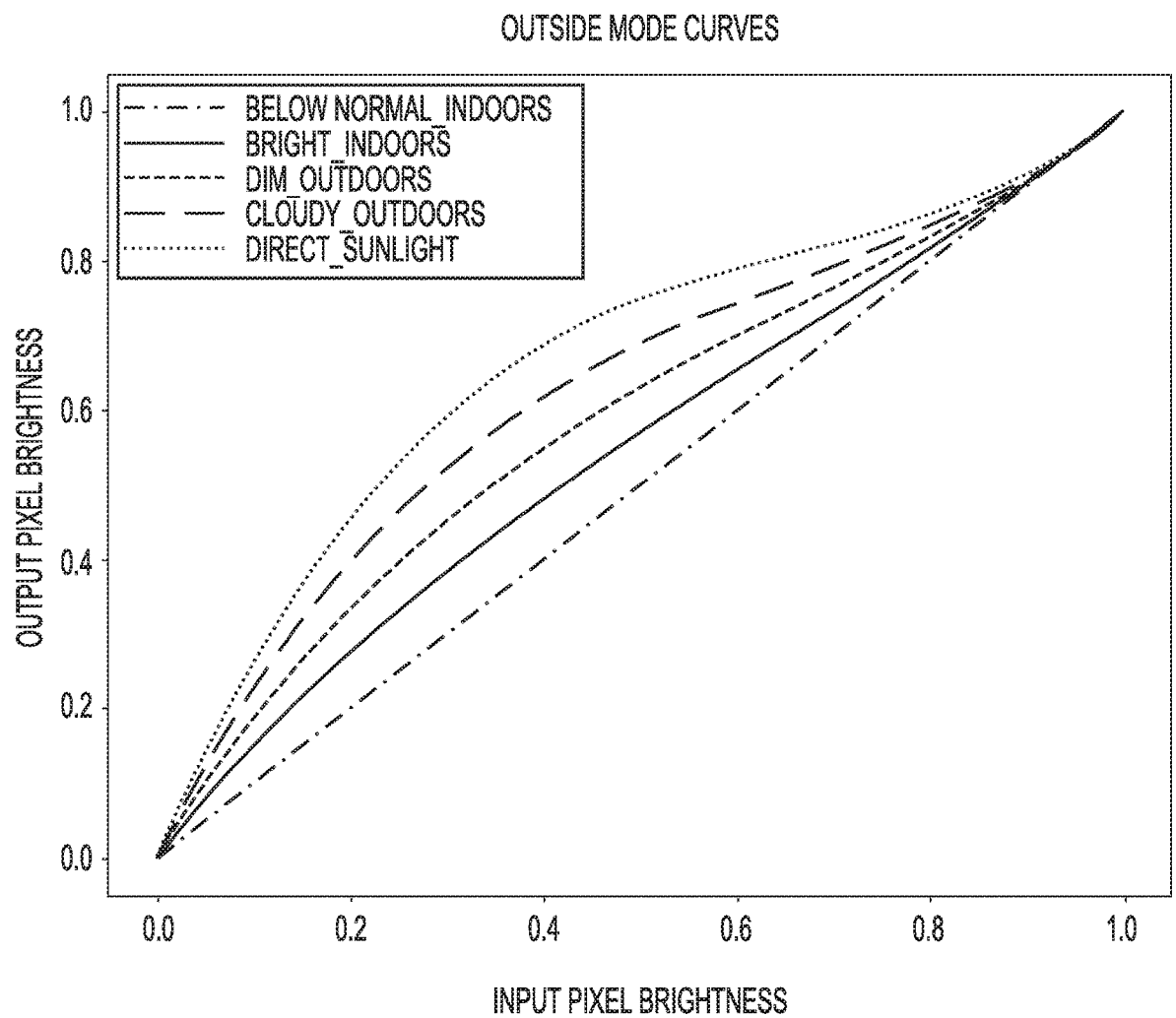
FIG. 4 shows mapping curves corresponding to mapping functions in accordance with one example.

FIG. 4 shows mapping curves corresponding to mapping functions in accordance with one example. In this example, mapping curves that correspond to different mapping functions are shown. In this example, a set of parameters (e.g., the level of intensity of the red pixels, the green pixels, and the blue pixels and the brightness level of the display) may define the shape of a mapping curve. In this example, mapping curves are shown for the various lighting conditions, including: "BELOW NORMAL_INDOORS," "BRIGHT_INDOORS," "DIM_OUTDOORS," "CLOUDY_OUTDOORS," AND "DIRECT_SUNLIGHT." Each mapping curve corresponds to a mapping function that relates the input pixel brightness or intensity to an output pixel brightness or intensity. Although FIG. 4 shows only five mapping curves for five different lighting conditions with respect to the ambient light, additional or fewer mapping curves may be created. In addition, although not shown, similar mapping curves may be created that factor in the color temperature of the environment.

Figure 5:
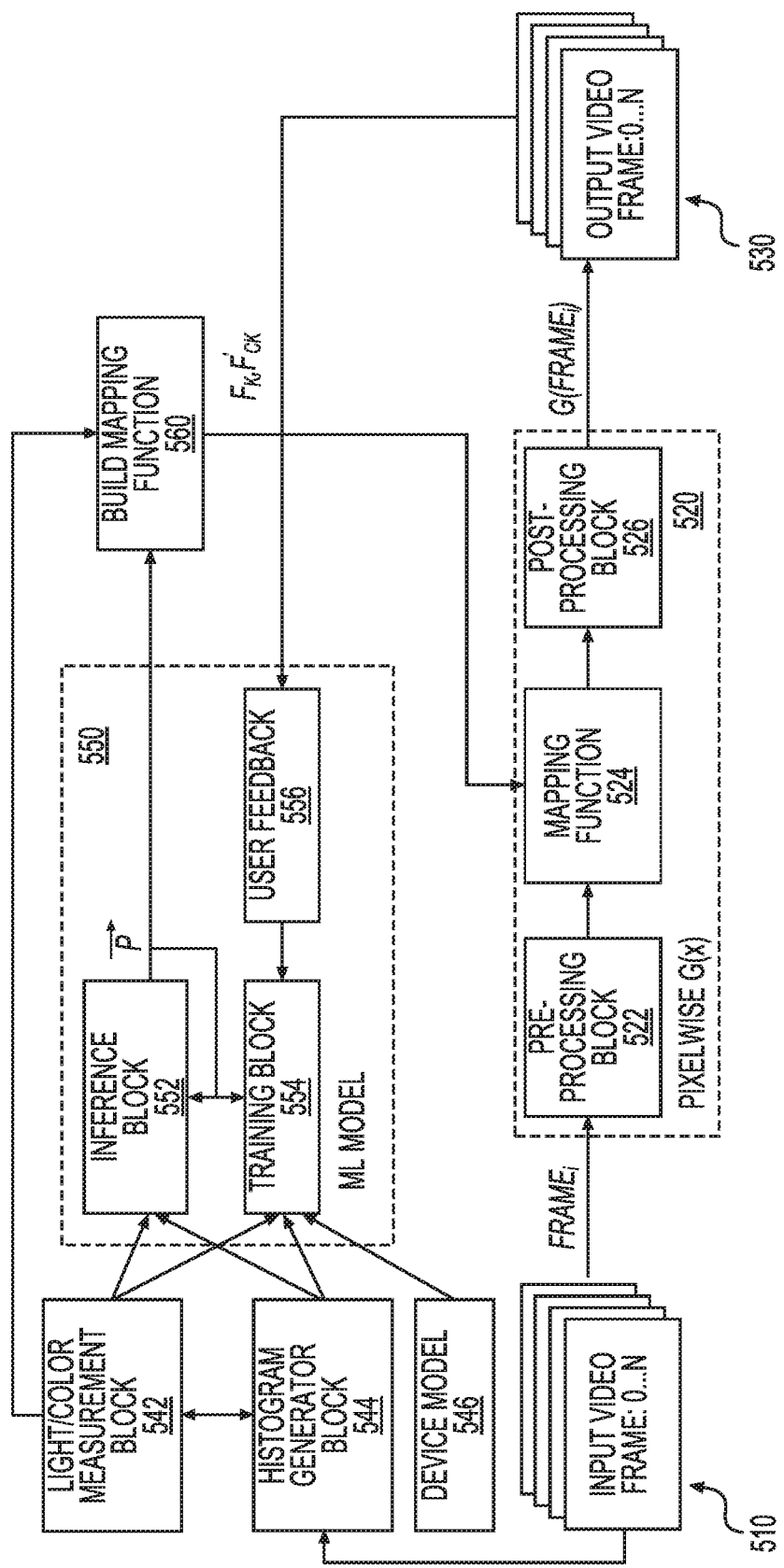
FIG. 5 shows a block diagram for automatic application of mapping functions to video signals based on inferred parameters in accordance with one example.

FIG. 5 is a block diagram for automatic application of mapping functions to video signals based on inferred parameters in accordance with one example. In one example, a user device (e.g., user device 120) may include instructions corresponding to modules that may enable the functionality described with respect to FIG. 5. As an example, device 120 may initiate the display of a video signal to a user of device 120. The video signal may include input video frames 510, which may be processed by a graphics processing pipeline 520, and then output as output video frames 530. The video signal may be encoded into frames or other types of units using any of the video encoding standards, including H.264. Frames corresponding to the video signal may include pixels. The pixels corresponding to the input frames may first be processed by a pre-processing block 522. The pixels may then be modified by an application of at least one mapping function 524. Next, the pixels may be processed by a post-processing block 526 before being output as output video frames 530. The output video frames 530 may be used to display content corresponding to the video signal.

As an example, device 120 may include instructions corresponding to a light/color measurement block 542, which may be configured to receive ambient light intensity information from a light sensor (e.g., a light meter) and process the sensor generated information. In addition, light/color measurement block 542 may process the color temperature of the ambient light. In this example, the processing by light/color measurement block 542 may include categorizing the light sensor generated information into certain classes of ambient light. As an example, as shown in Table 1, light/color measurement block 542 may classify the ambient light conditions into nine categories of the ambient light conditions. Light/color measurement block 542 may have instructions that may categorize the ambient light conditions into color temperature categories as well. Color temperature categories may include cool and warm environment. Color may be defined by the chromacity values associated with the color of the light. Histogram generator block 544 may process input video frames 510 and generate histogram values that may be used to characterize the type, or the nature of the content being processed as part of the video signal. In certain examples, this characterization of the content may include determining whether the video signal corresponds to a movie, a game, a sports event, or some other type of content. Device model 546 may include information concerning a model number or model type of the device that is processing the video signal. In this example, device model 546 may be stored in a memory associated with the device (e.g., device 120).

With continued reference to FIG. 5, machine learning (ML) model 550 may include an inference block 552 and a user feedback 556. Inference block 552 may include instructions configured to receive as input the ambient light intensity values (e.g., in lux), the color temperature of the ambient light, and the content histogram values. Training block 554 may include instructions configured to receive as input the ambient light intensity values (e.g., in lux), the color temperature of the ambient light, the content histogram values, and device model information. In one example, the instructions corresponding to the training block 554 may perform an algorithm shown in Table 3 below:

TABLE 3

1. Identify the device class that the device belongs to and select the corresponding model
2. Construct error function from user feedback and inferred parameter vector $\vec{P}$
3. Use below data to train the model selected in step 1 recursively:
a. Input: light/color, histogram,
b. Output: inferred parameter vector $\vec{P}$
c. Error function: use the error function from step 2

Still referring to FIG. 5, build mapping function 560 may include instructions configured to build and select a mapping function based on the inferred mapping parameters generated based on the machine learning (ML) model 550. Although FIG. 5 shows certain blocks arranged in a certain manner to generate training data for the machine learning models, these blocks could be arranged differently. Table 4 below shows high-level instructions for performing the functions associated with the various blocks described with respect to FIG. 5.

TABLE 4

1: Initialize video playback
2: For Frame$_i$ in input video
3: Get the pretrained model based on the device model
4: For Frame$_i$ in input video
5:     Get Frame$_i$ histogram
6:     Get environments light/color
7:     If environments light/color changed or histogram changed then
8:         Infer parameter vector $\vec{P}$ from the pretrained model (input: light/color, histogram)
9:         Select new mapping functions F$_k$ and F'$_{ck}$
10:    Else
11:        Use mapping functions F$_k$ and F'$_{ck}$
12:    End if
13:    For each pixel p$_j$ in Frame$_i$
14:        Pre-Process RGB values
15:        Apply mapping function F$_k$
16:        Post-process the output
17:        If color measurement is present then
18:            Apply mapping functions F'$_{ck}$ per channel c
19:        End If
20:    End For
21: End for
22: Ask user for feedback
23: If user feedback available then
24:     upload user feedback, device model, input (light/color, histogram), and corresponding inferred parameter vector $\vec{P}$.

Figure 6:
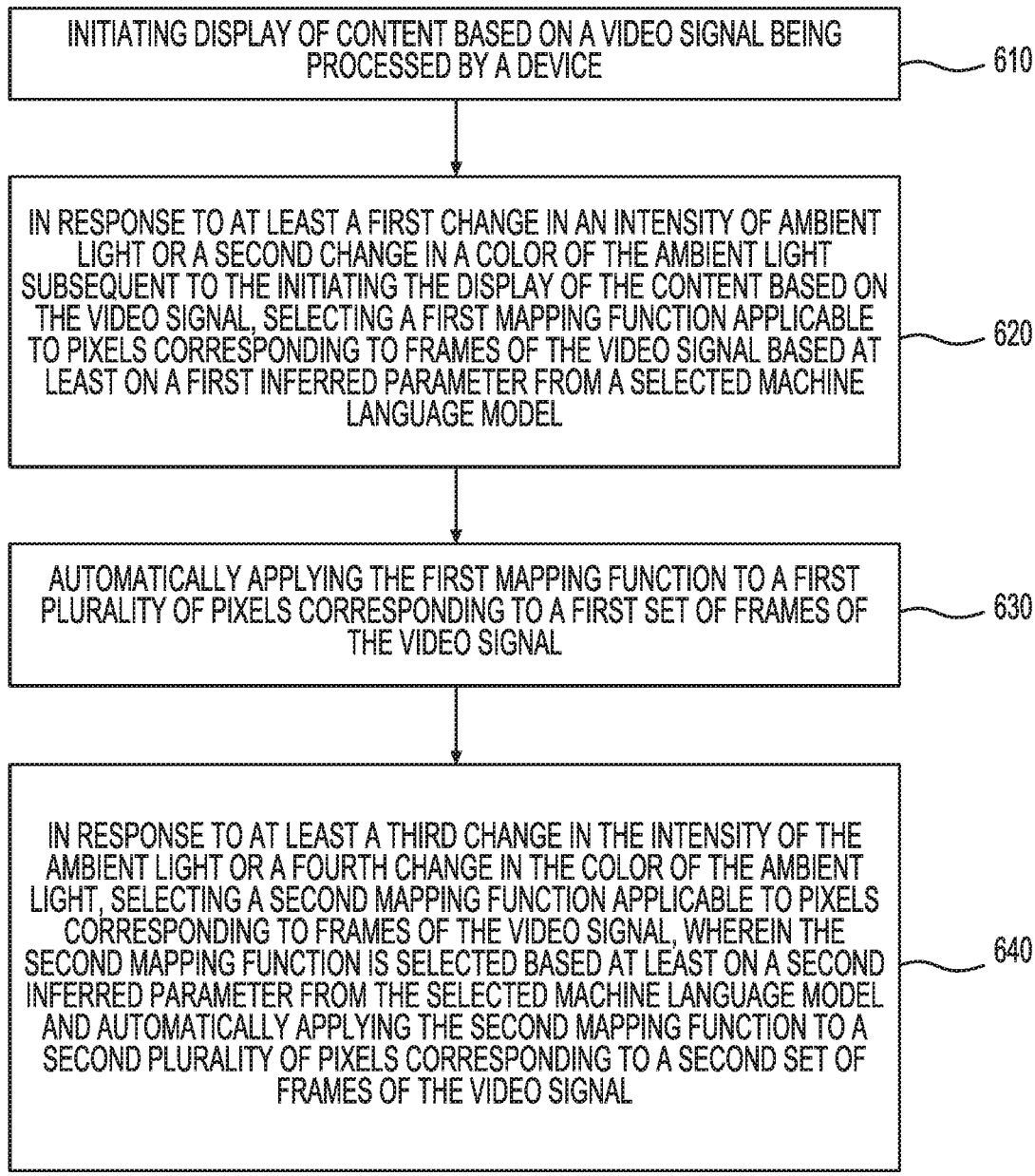
FIG. 6 shows a flow chart of a method for automatic application of mapping functions to video signals based on inferred parameters in accordance with one example.

FIG. 6 shows a flow chart of a method for automatic application of mapping functions to video signals based on inferred parameters in accordance with one example. Step 610 may include initiating display of content based on a video signal being processed by a device. As explained earlier a processor and corresponding instructions stored in a memory in device 120 may perform this step.

Step 620 may include in response to at least a first change in an intensity of ambient light or a second change in a color temperature of the ambient light subsequent to the initiating of the display of the content based on the video signal, selecting a first mapping function applicable to pixels corresponding to frames of the video signal based at least on a first inferred parameter from a selected machine learning model. As explained earlier with respect to FIG. 5, instructions corresponding to modules including a machine learning model-based arrangement may be used to perform this step. Thus sensors, including ambient light sensors and color temperature sensors, and corresponding instructions (e.g., appropriate application programming interfaces (APIs)) may detect a change in the intensity of the ambient light or a change in the color temperature of the ambient light. In addition, the relevant portions of the pseudocode provided in Table 4 may when translated into executable instructions and processed by a processor may select a first mapping function applicable to pixels corresponding to the frames of the video signal based at least on inferred parameters from a selected machine learning model.

Step 630 may include automatically applying the first mapping function to a first plurality of pixels corresponding to a first set of frames of the video signal. As described earlier with respect to FIG. 5, mapping function 524 may process the pixels after they are pre-processed by pre-processing block 522 of FIG. 5. Thus, in this example, as part of this step at least one mapping function may be applied to the pixels that may modify the intensity of the pixels. Other values corresponding to the pixels may also be changed, including hue, saturation, contrast etc.

Step 640 may include in response to at least a third change in the intensity of the ambient light or a fourth change in the color temperature of the ambient light, selecting a second mapping function applicable to pixels corresponding to frames of the video signal, where the second mapping function is selected based at least on a second inferred parameter from the selected machine learning model and automatically applying the second mapping function to a second plurality of pixels corresponding to a second set of frames of the video signal. This step may be performed in a similar manner as step 620. This way if the user's environment changes in terms of light/color conditions, device 120 may continually apply appropriate mapping functions by detecting in real-time the changes in the environment.

In conclusion, in one example, the present disclosure relates to a method including initiating display of content based on a video signal being processed by a device. The method may further include in response to at least a first change in an intensity of ambient light or a second change in a color of the ambient light subsequent to the initiating of the display of the content based on the video signal, selecting a first mapping function applicable to pixels corresponding to frames of the video signal based at least on a first inferred parameter from a selected machine learning model. The method may further include automatically applying the first mapping function to a first plurality of pixels corresponding to a first set of frames of the video signal.

The method may further include in response to at least a third change in the intensity of the ambient light or a fourth change in the color temperature of the ambient light, selecting a second mapping function applicable to pixels corresponding to frames of the video signal, where the second mapping function is selected based at least on a second inferred parameter from the selected machine learning model and automatically applying the second mapping function to a second plurality of pixels corresponding to a second set of frames of the video signal.

The selected machine learning model may be selected based at least on a device model of the device. The method may further include requesting the user of the device to provide feedback corresponding to any change in a perceptual quality of the content being displayed subsequent to at least one of a first application of the first mapping function to the first plurality of pixels corresponding to the first set of frames of the video signal or a second application of the second mapping function to the second plurality of pixels corresponding to the second set of frames of the video signal.

The method may further include transmitting information concerning the feedback, the device model, and the at least one inferred parameter to a remote computing system from the device.

The method may further include training machine learning models, including the selected machine learning model, based on preference data concerning a perceptual quality of displayed content by the device. The method may further include training machine learning models, including the selected machine learning model, based on training data, where at least a subset of the training data is generated based on feedback from users of each of the devices with the device model.

In another example, the present disclosure relates to a device including a processor configured to initiate display of content based on a video signal being processed by the device. The device may further include a memory comprising at least one module including instructions configured: (1) to, in response to at least a first change in an intensity of ambient light or a second change in a color of the ambient light subsequent to an initiation of the display of the content based on the video signal, select a first mapping function applicable to pixels corresponding to frames of the video signal based at least on a first inferred parameter from a selected machine learning model, and (2) to automatically apply the first mapping function to a first plurality of pixels corresponding to a first set of frames of the video signal.

The device may further include a second set of instructions configured to in response to at least a third change in the intensity of the ambient light or a fourth change in the color temperature of the ambient light, select a second mapping function applicable to pixels corresponding to frames of the video signal, where the second mapping function is selected based at least on a second inferred parameter from the selected machine learning model and automatically apply the second mapping function to a second plurality of pixels corresponding to a second set of frames of the video signal. The selected machine learning model may be selected based at least on a device model of the device.

The at least one module may further include a third set of instructions configured to request the user of the device to provide feedback corresponding to any change in a perceptual quality of the content being displayed subsequent to at least one of a first application of the first mapping function to the first plurality of pixels corresponding to the first set of frames of the video signal or a second application of the second mapping function to the second plurality of pixels corresponding to the second set of frames of the video signal.

The device may further include a third set of instructions configured to transmit information concerning the feedback, the device model, and the at least one inferred parameter to a remote computing system from the device. The device may further include a fourth set of instructions configured to train machine learning models, including the selected machine learning model, based on preference data concerning a perceptual quality of displayed content by the device.

The at least one module may further comprise an inference block and a training block configured to generate training data for use by the inference block, where at least a subset of the training data is generated based on feedback from users of each of the devices with the device model.

In yet another example, the present disclosure relates to a computer readable medium including a first set of instructions configured to initiate display of content based on a video signal to a user of a device. The computer readable medium may further include a second set of instructions configured to in response to at least a first change in an intensity of ambient light or a second change in a color of the ambient light subsequent to the initiating of the display of the content based on the video signal, select a first mapping function applicable to pixels corresponding to frames of the video signal based at least on a first inferred parameter from a selected machine learning model. The computer readable medium may further include a third set of instructions configured to automatically apply the first mapping function to a first plurality of pixels corresponding to a first set of frames of the video signal.

The computer readable medium may further include a fourth set of instructions configured to in response to at least a third change in the intensity of the ambient light or a fourth change in the color temperature of the ambient light, select a second mapping function applicable to pixels corresponding to frames of the video signal, where the second mapping function is selected based at least on a second inferred parameter from the selected machine learning model and automatically apply the second mapping function to a second plurality of pixels corresponding to a second set of frames of the video signal.

The selected machine learning model may be selected based at least on a device model of the device.

The computer readable medium may further include a fifth set of instructions configured to request the user of the device to provide feedback corresponding to any change in a perceptual quality of the content being displayed subsequent to at least one of a first application of the first mapping function to the first plurality of pixels corresponding to the first set of frames of the video signal or a second application of the second mapping function to the second plurality of pixels corresponding to the second set of frames of the video signal.

The computer readable medium may further include a sixth set of instructions configured to transmit information concerning the feedback, the device model, and the at least one inferred parameter to a remote computing system from the device. The computer readable medium may further include a fourth set of instructions configured to train machine learning models, including the selected machine learning model, based on preference data concerning a perceptual quality of displayed content by the device.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
   initiating display of content based on a video signal being processed by a device;
   in response to any of a first change in an intensity of ambient light, a second change in a color temperature of the ambient light, or a third change in a type or a nature of the content being displayed:
   analyzing, with a trained machine learning model, ambient light intensity information and a histogram generated based on the video signal to infer a first parameter, the machine learning model being trained based on a first set of values corresponding to an intensity of ambient light, a second set of values corresponding to a color temperature of the ambient light, and a third set of values corresponding to a type or nature of content within the video signal;
   selecting a first mapping function applicable to pixels corresponding to frames of the video signal, the selection being based on the first inferred parameter; and
   a adjusting brightness of the content by automatically applying the first mapping function to a first plurality of pixels corresponding to a first set of frames of the video signal.

2. The method of claim 1, further comprising:
   responsive to detecting a change in the intensity of the ambient light or in the color temperature of the ambient light, selecting a second mapping function applicable to pixels corresponding to frames of the video signal, wherein the second mapping function is selected based at least on a second inferred parameter output by the trained machine learning model; and
   automatically applying the second mapping function to a second plurality of pixels corresponding to a second set of frames of the video signal.

3. The method of claim 2, wherein the trained machine learning model is selected based at least on a device model of the device.

4. The method of claim 3 further comprising requesting feedback from a user of the device, the feedback being associated with a change in a perceptual quality of the content being displayed subsequent to at least one of a first application of the first mapping function to the first plurality of pixels corresponding to the first set of frames of the video signal or a second application of the second mapping function to the second plurality of pixels corresponding to the second set of frames of the video signal.

5. The method of claim 4 further comprising transmitting information pertaining to the feedback, the device model, and the at least one inferred parameter to a remote computing system from the device.

6. The method of claim 3, wherein a subset of training data used to train the trained machine learning model is generated based on feedback from users of a plurality of devices with the device model.

7. The method of claim 1, wherein the trained machine learning model is one of multiple machine learning models and the method further comprises:

training the multiple machine learning models based on preference data associated with perceptual quality of displayed content by the device.

8. A device comprising:
a processor configured to initiate the display of content based on a video signal being processed by the device; and
a machine learning model configured to analyze ambient light intensity information and a histogram generated based on the video signal to infer a first parameter, the machine learning model being trained based on a first set of values corresponding to an intensity of ambient light, a second set of values corresponding to a color temperature of ambient light, and a third set of values correspond to a type of content within the video signal; and
computer-executable instructions stored in memory and configured to:
select a first mapping function applicable to pixels corresponding to frames of the video signal based on the first inferred parameter; and to
adjust brightness of the content by automatically applying the first mapping function to a first plurality of the pixels corresponding to a first set of frames of the video signal.

9. The device of claim 8 wherein the computer-executable instructions are further configured to:
responsive to detecting a change in the intensity of the ambient light or in the color temperature of the ambient light, select a second mapping function applicable to pixels corresponding to frames of the video signal, wherein the second mapping function is selected based at least on a second inferred parameter output by the trained machine learning model; and
automatically apply the second mapping function to a second plurality of pixels corresponding to a second set of frames of the video signal.

10. The device of claim 9, wherein the trained machine learning model is selected based at least on a device model of the device.

11. The device of claim 10, wherein the computer-executable instructions are further configured to request feedback from a user of the device, the feedback pertaining to a change in a perceptual quality of the content being displayed subsequent to at least one of a first application of the first mapping function to the first plurality of pixels corresponding to the first set of frames of the video signal or a second application of the second mapping function to the second plurality of pixels corresponding to the second set of frames of the video signal.

12. The device of claim 11, wherein the computer-executable instructions are further configured to transmit information concerning the feedback, the device model, and the at least one inferred parameter to a remote computing system from the device.

13. The device of claim 10, wherein the computer-executable instructions are implemented by an inference block and a training block configured to generate training data for use by the inference block, wherein at least a subset of the training data is generated based on feedback from users of a plurality of devices with the device model.

14. The device of claim 9, wherein the trained machine learning model is trained based on preference data concerning a perceptual quality of displayed content by the device.

15. A non-transitory computer readable medium encoding computer-executable instructions for executing a computer process, the computer process comprising:
initiating a display of content based on a video signal to a user of a device;
analyzing, with a trained machine learning model, ambient light intensity information and a histogram generated based on the video signal to infer a first parameter, the machine learning model being trained based on at least a first set of values corresponding to an intensity of ambient light, a second set of values corresponding to a color temperature of ambient light, and a third set of values corresponding to a type or a nature of content in the video signal;
selecting a first mapping function applicable to pixels corresponding to frames of the video signal based on the first inferred parameter inferred by the machine learning model; and
adjusting brightness of the content by automatically applying the first mapping function to a first plurality of pixels corresponding to a first set of frames of the video signal.

16. The non-transitory computer readable medium of claim 15, wherein the computer process further comprises:
in response to detecting a change in the intensity of the ambient light or in the color temperature of the ambient light, selecting a second mapping function applicable to pixels corresponding to frames of the video signal, wherein the second mapping function is selected based at least on a second inferred parameter output by the trained machine learning model; and
automatically applying the second mapping function to a second plurality of pixels corresponding to a second set of frames of the video signal.

17. The non-transitory computer readable medium of claim 16, wherein the computer process further comprises:
selecting the trained machine learning model based at least on a device model of the device.

18. The non-transitory computer readable medium of claim 17, wherein the computer process further comprises receiving feedback from a user of the device, the feedback pertaining to a change in a perceptual quality of the content being displayed subsequent to at least one of a first application of the first mapping function to the first plurality of pixels corresponding to the first set of frames of the video signal or a second application of the second mapping function to the second plurality of pixels corresponding to the second set of frames of the video signal.

19. The non-transitory computer readable medium of claim 18, wherein the computer process further comprises:
transmitting information pertaining to the feedback, the device model, and the at least one inferred parameter to a remote computing system.

20. The non-transitory computer readable medium of claim 15, wherein the trained machine learning model is trained based on preference data concerning a perceptual quality of displayed content by the device.

* * * * *